D. F. BALENTINE.

Seed-Planter and Fertilizer-Distributer.

No. 165,198.               Patented July 6, 1875.

WITNESSES:                INVENTOR:
                          David F. Balentine
                          BY
                          ATTORNEYS.

UNITED STATES PATENT OFFICE.

DAVID F. BALENTINE, OF MOUNT GALLAGHER, SOUTH CAROLINA.

IMPROVEMENT IN SEED-PLANTERS AND FERTILIZER-DISTRIBUTERS.

Specification forming part of Letters Patent No. 165,198, dated July 6, 1875; application filed May 15, 1875.

*To all whom it may concern:*

Figure 1:
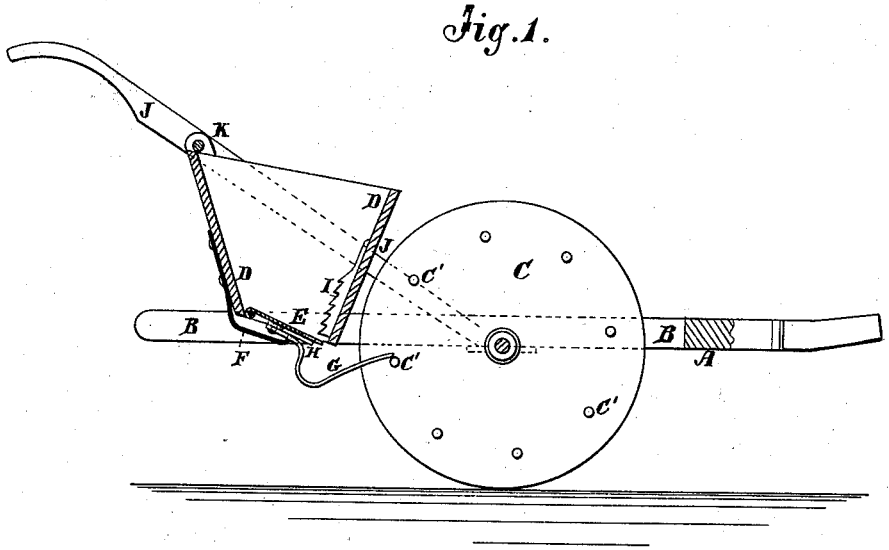
Figure 2:
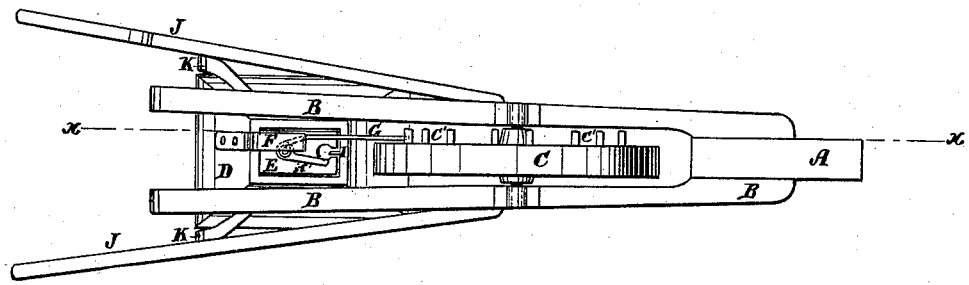

Be it known that I, DAVID F. BALENTINE, of Mount Gallagher, in the county of Laurens and State of South Carolina, have invented an Improvement in Seed-Planter and Fertilizer-Distributer, of which the following is a specification:

Figure 1 is a vertical longitudinal section of my improved machine, taken through the line $x\ x$, Fig. 2. Fig. 2 is a bottom view of the same.

Similar letters of reference indicate corresponding parts.

The object of this invention is to furnish an improved machine for planting cotton and other seeds, and distributing guano and other fine fertilizers, which shall be simple in construction, inexpensive in manufacture, and reliable in operation.

The invention consists in the combination of the hinged bottom, the toothed plate, the spring, the arm, and the pins, with the hopper and the wheel of the machine, as hereinafter fully described.

A is a short draft-bar, to the opposite sides of the rear end of which are attached the forward ends of two parallel side bars, B. The side bars B are placed at such a distance apart as to receive the wheel C between them. The journals of the wheel C revolve in bearings attached to the side bars B, and to the side of said wheel is attached a circle of pins, $c'$. To and between the side bars B, and in the rear of the wheel C, is attached the hopper D, the bottom E of which is inclined forward, and is hinged at its rear edge to the lower edge of the rear side of the said hopper D. The bottom E is supported in position by a spring, F, attached to the rear side of the hopper D. To the bottom E is attached an arm, G, that is curved downward, upward, and forward, and projects into such a position that its forward end may be struck by the pins $c'$ attached to the wheel C. In the forward part of the bottom E is formed an opening for the seed to escape through, which opening may be partially covered to regulate the amount of seed discharged by a plate, H, pivoted to the lower side of the said bottom E. To the inner surface of the forward side of the hopper D is attached a narrow plate or bar, I, the rear edge of which projects into the said hopper D, and has saw-teeth formed upon it to take hold of the seeds or fertilizer as the bottom E rises, and cause them to pass out through the opening in said bottom. By this construction the bottom E will be constantly moving up and down, keeping the seed or fertilizer in the lower part of the hopper loosened, and causing it to pass out regularly. J are the handles, the forward ends of which are attached to the side bars B, and the rear ends of which are supported at the proper elevation by bars K, the lower ends of which are attached to said side bars B.

Having thus described my invention, I claim as new and desire to secure by Letters Patent—

The combination of the hinged bottom E, the toothed plate I, the spring F, and the arm G, with the hopper D, and pins $c'$ on the wheel C of the machine, substantially as herein shown and described.

DAVID F. BALENTINE.

Witnesses:
I. M. BOYD,
W. L. BOYD.